Figure 1:
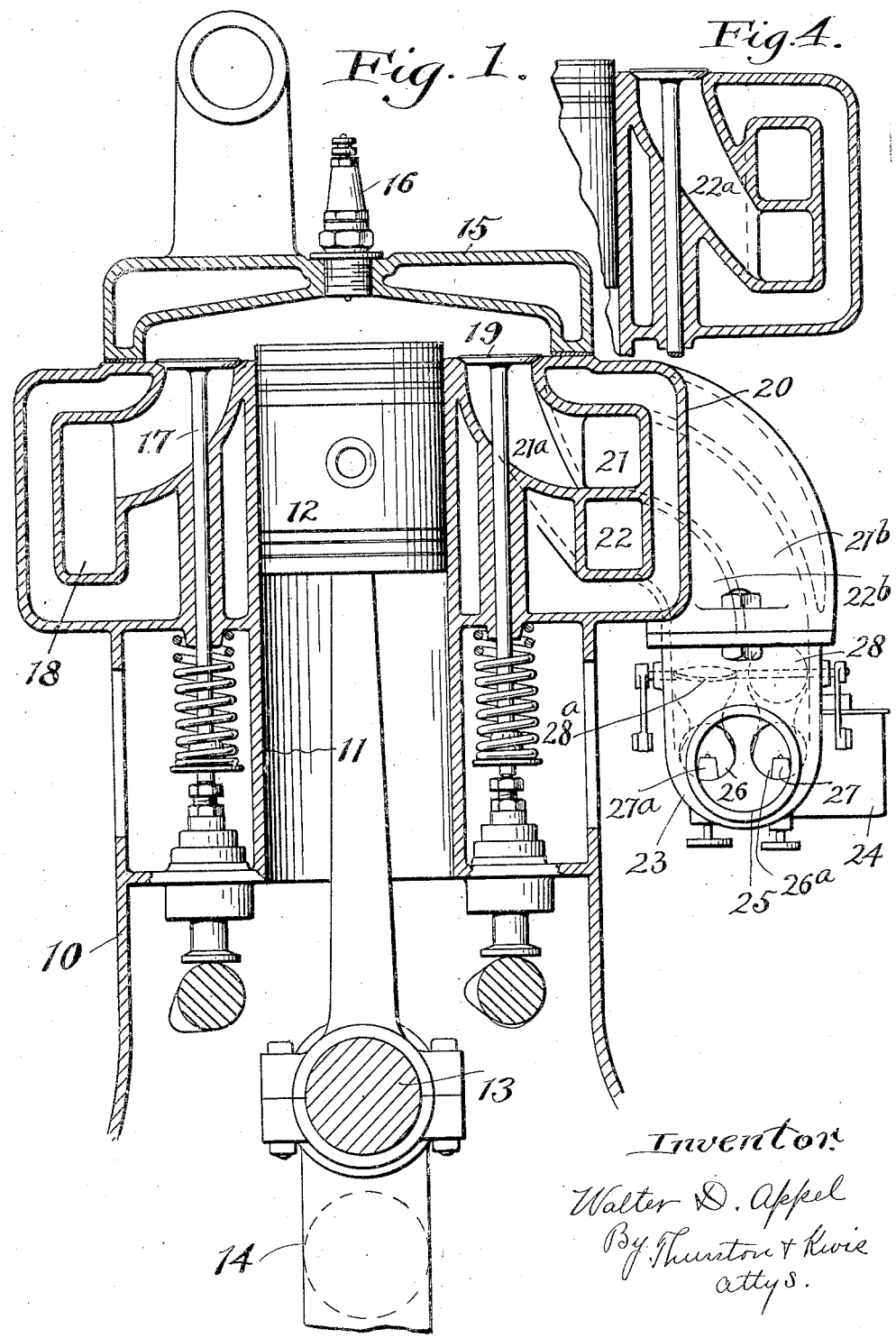

W. D. APPEL.
INTERNAL COMBUSTION ENGINE.
APPLICATION FILED DEC. 29, 1916.

1,422,810.

Patented July 18, 1922.
2 SHEETS—SHEET 2.

Inventor:
Walter D. Appel,
By Thurston & Know
attys

UNITED STATES PATENT OFFICE.

WALTER D. APPEL, OF CLEVELAND HEIGHTS, OHIO.

INTERNAL-COMBUSTION ENGINE.

1,422,810.  Specification of Letters Patent.  Patented July 18, 1922.

Application filed December 29, 1916. Serial No. 139,457.

*To all whom it may concern:*

Be it known that I, WALTER D. APPEL, a citizen of the United States, residing at Cleveland Heights, in the county of Cuyahoga and State of Ohio, have invented a certain new and useful Improvement in Internal-Combustion Engines, of which the following is a full, clear, and exact description.

This invention relates to internal combustion engines and particularly to engines having a plurality of intake and a plurality of exhaust valves per cylinder.

It is a well known fact that an engine has maximum efficiency at a certain definite speed and the fuel passageways are so proportioned that the fuel has a definite velocity at that speed. If the speed of the engine increases above the predetermined speed at which maximum efficiency is obtained, the fuel is sucked into the cylinders at such a high rate that a full charge is not received in the cylinders and hence there is less than maximum volumetric efficiency and less than maximum engine efficiency. If the engine speed drops below the predetermined speed which gives maximum efficiency the velocity of the gas is so low that satisfactory carburation is not obtained and condensation takes place in the manifold or passageways leading to the cylinders causing poor engine operation and a materially decreased efficiency.

An attempt has been made to improve the operation of internal combustion engines by increasing the number of intake and exhaust valves, and at the present time engines with two intake and two exhaust valves per cylinder are in use. This improvement, that is to say the doubling of the number of intake and exhaust valves has certain advantages, but does not give high efficiency at high and low speeds.

The object of the present invention is to provide certain improvements by which the velocity of the gas passing between the carbureter or carbureters and the engine cylinders may be controlled and made substantially uniform at different speeds so that high efficiency and satisfactory operation are obtained throughout the entire speed range.

I attain the above object in an engine having two or more intake valves per cylinder by providing separate intake or supply passageways for each intake valve of a cylinder. In other words, I supply fuel for one set of intake valves of a multi-cylinder engine through one passageway, and supply the fuel to the other set through a different passageway. In addition I provide means for separately controlling the flow of fuel through the passageways leading to the separate or duplicate sets of intake valves so that at low speeds the fuel is supplied through one set of valves and one intake passageway, and at high speeds the fuel is supplied through both sets of valves and the two passageways leading thereto. By the proper manipulation of the throttle valve or valves controlling the passage of fuel to the two sets of valves I am enabled in this manner to maintain a substantially constant velocity of fuel through the fuel passageways and intake ports over an exceedingly wide range of speed with the attendant advantage of high efficiency and satisfactory operation throughout this range of speed.

My invention may be further briefly summarized as consisting in certain novel details of construction and combinations and arrangements of parts which will be described in the specification and set forth in the appended claims.

Figure 2:
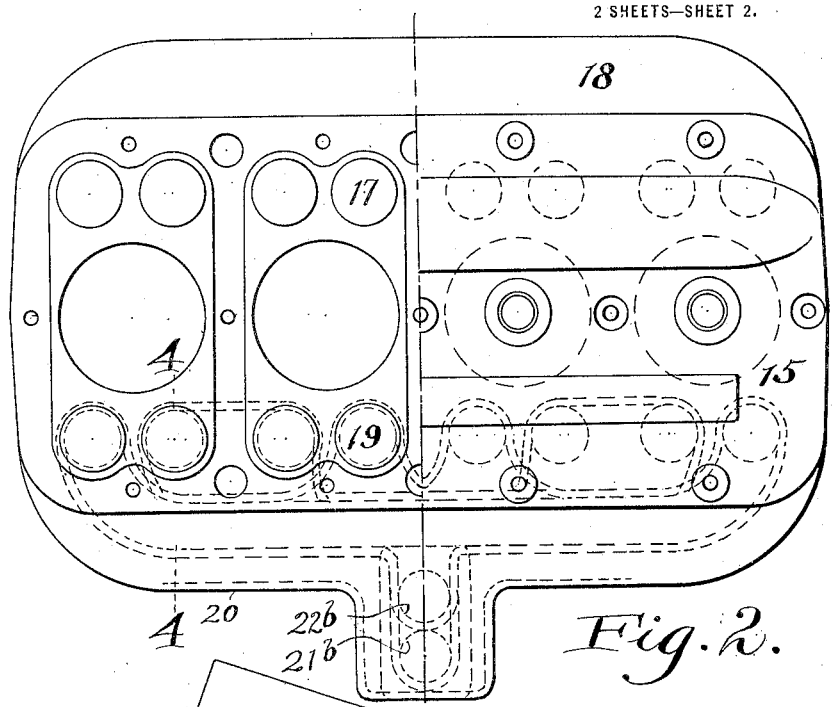
Figure 3:
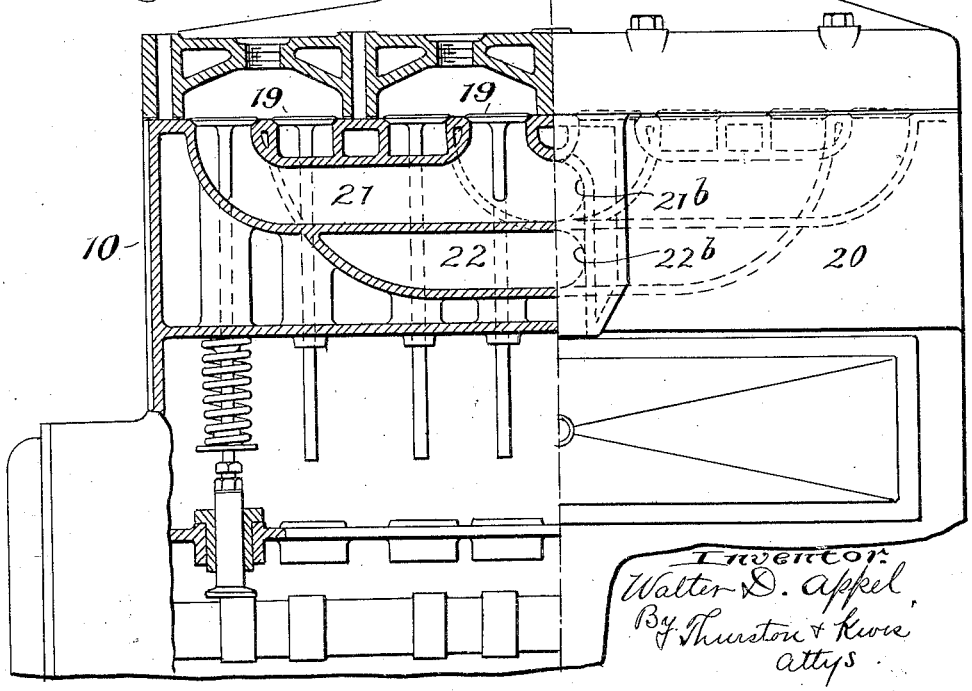

In the accompanying sheets of drawings, Fig. 1 is a vertical sectional view through one cylinder of the engine; Fig. 2 is a top plan view with one-half of the cylinder-head or cap removed; Fig. 3 is a side view with substantially one-half of the engine in section showing the two separate intake manifold passageways leading to the two sets of intake valves respectively; and Fig. 4 is a sectional view through the intake side of a portion of the engine, the section being taken substantially along the line 4—4 of Fig. 2.

Referring now to the drawings, 10 represents the engine casting or housing having cylinders 11 of which there may be any number cast en bloc or separately, but in this case I have shown a four-cylinder engine. The cylinders receive pistons 12 connected in the usual manner to the cranks 13 of a crank shaft 14 indicated somewhat conventionally in Fig. 1. At the top of the engine there may be a continuous head 15 which as here shown is provided with spark plugs 16. The parts so far described may be of any desired construction, the details being immaterial to my invention.

To control the admission to and exhaust of gases from the cylinders the engine is provided with two intake and two exhaust valves per cylinder so that for an engine say of four cylinders as here shown, there will be eight intake valves and eight exhaust valves. The exhaust valves which are designated 17, control ports, all of which may be connected to a single exhaust manifold 18. The inlet valves which are here designated 19, control ports which are not all supplied from the same manifold passageway, but to attain the object heretofore clearly described, I provide two separate and distinct intake manifold passageways which may be and preferably are embodied in a single manifold structure which is designated as a whole by the reference character 20, and I supply the fuel to the ports controlled by one set of intake valves through one passageway, and supply fuel to the ports controlled by the other set of valves through the other passageway. In other words, one intake port of each cylinder is connected to one intake passageway and the other intake port of the cylinder is connected with the other passageway.

While it will be obvious that my invention can be carried out by many different relative arrangements of the passageways, I prefer the manifold construction and the arrangement of passageways substantially as shown in the drawings, wherein the intake manifold has two passageways 21 and 22, one arranged above the other and extending horizontally alongside the cylinders. The upper passageway 21 is connected to one intake port of each cylinder by a connecting passageway 21ª such as shown in detail in Fig. 1, and the lower passageway 22 is connected to the other intake ports by passageways, one of which is shown at 22ª in Fig. 4. The two passageways 21 and 22 have downward extensions 21ᵇ and 22ᵇ which are separately controlled and are connected to the carbureting means either in the form of a single carburetor or two carburetors. I prefer to employ a single carburetor such as shown somewhat conventionally at 23, this carburetor as here shown, having a single float controlled chamber 24 and a main air intake opening 25 leading to a chamber with which the passageway extension 21ᵇ and 22ᵇ communicate by opening 26, 26ª. This carburetor in addition is provided with two separate jet tubes indicated at 27 and 27ª from which nebulized fuel is supplied directly to the two manifold passageways, one tube supplying fuel to one passageway and the other to the second passageway.

As here shown, the passage of fuel through the two separate and distinct passageways described is controlled by two throttle valves 28 and 28ª which may be shifted in any desired manner. They may be moved independently or simultaneously, but whatever form of valve shifting means is utilized, at the lower speeds, fuel is supplied through one passageway and through one set of valves, and when the speed is increased to a predetermined amount, fuel is supplied through both passageways and through both sets of valves. In this manner the velocity of gas is maintained substantially uniform throughout the entire speed range of the engine.

While I have shown my invention applied to an engine having two intake valves per cylinder, it may be desirable to have more than this number of intake valves per cylinder, such as three valves, and if more than two intake valves per cylinder are provided, there will preferably be a corresponding number of separate passageways supplying the valves and separately controllable, the same as with the two sets of valves and the two separate passageways.

Furthermore, I do not wish to be confined to the use of a single carbureter or to the use of two carbureter jet tubes, for it may be desirable to use two separate carbureters or if a single carbureter is used, under some circumstances a single jet tube may be employed to advantage. Additionally I do not desire to be confined to an engine having more than one exhaust valve per cylinder, it being essential only that the engine have two or more intake valves per cylinder.

I therefore do not desire to be confined to the exact details or arrangements shown, but aim in my claims to cover all modifications which do not involve a departure from my invention in its broadest aspects.

Having thus described my invention, what I claim is:

1. An internal combustion engine having two sets of intake valves including two valves per cylinder and controllable means whereby fuel is supplied to the cylinders through one or both sets of valves.

2. An internal combustion engine having two or more intake valves per cylinder, and means for supplying fuel to the cylinder or cylinders through part or all the valves.

3. An internal combustion engine having a plurality of intake valves for each cylinder and a separate intake passageway for supplying fuel to each intake valve of the cylinder and controlling means by which fuel is supplied by one passageway and intake valve at low engine speeds, and through all the intake valves and passageways at high engine speeds.

4. An internal combustion engine having two sets of intake valves including two valves per cylinder, two separate fuel supplying passageways, one leading to one set of valves, and the other to the second set of valves and controlling means for said passageways, said controlling means permitting the fuel to pass through one or both passageways depending upon the speed of the engine.

5. An internal combustion engine having a plurality of intake valves per cylinder, separate fuel supplying passageways leading to the valves of each cylinder and means whereby fuel is supplied to the cylinder through one passageway and valve or through all the passageways and valves depending upon the engine speed.

6. An internal combustion engine having two sets of intake valves including two valves per cylinder, two separate fuel supplying passageways each leading to one set of valves, and controlling valves in said passageways by which fuel is supplied through one passageway and intake valve for low speeds and through both passageways and both intake valves for relatively high speeds.

7. An internal combustion engine having two sets of intake valves including two valves per cylinder, two separate fuel supplying passageways, one leading to one set of valves and the other to the second set of valves, carbureting means having a separate fuel supplying member for each passageway and controlling means by which fuel is supplied to each cylinder through one or both passageways and one or both intake valves depending upon the speed of the engine.

8. An internal combustion engine having two sets of intake valves including two valves per cylinder, two separate fuel supplying passageways, one leading to one set of valves and the other to the second set of valves; means for supplying fuel to both passageways, and valves for closing and opening said passageways successively as the speed varies whereby fuel is supplied to each cylinder through one or both intake valves depending on the speed of the engine.

9. The method of operating an internal combustion engine having a plurality of intake valves per cylinder, which comprises supplying fuel to the cylinder through one intake valve at low engine speeds, and through more than one intake valve at relatively high engine speeds.

10. In an internal combustion engine, the combination with a cylinder, of a plurality of periodically controlled intake ports through which the charge constituents may be supplied to the cylinder, and means for rendering effective a greater or lesser number of said intake ports in accordance with the power demands of the engine.

11. An internal combustion engine power plant wherein the combustible mixture is conveyed from the charge forming means to each cylinder of the engine through a plurality of supply passageways and associated intake ports, characterized by the fact that a greater or lesser number of the supply passageways and associated intake ports are rendered effective in accordance with the power demands of the engine.

In testimony whereof, I hereunto affix my signature.

WALTER D. APPEL.